(12) United States Patent
Fisher

(10) Patent No.: US 8,478,681 B2
(45) Date of Patent: Jul. 2, 2013

(54) SYSTEM AND METHOD FOR AUCTION BASED SALES AND PROCUREMENT OF GEOGRAPHICALLY DISPERSED AVIATION FUEL AND SERVICES

(76) Inventor: Alexander Fisher, Jacksonville Beach, FL (US)

( * ) Notice: Subject to any disclaimer, the term of this patent is extended or adjusted under 35 U.S.C. 154(b) by 19 days.

(21) Appl. No.: 13/199,635

(22) Filed: Sep. 6, 2011

(65) Prior Publication Data
US 2012/0059754 A1 Mar. 8, 2012

Related U.S. Application Data

(60) Provisional application No. 61/402,894, filed on Sep. 7, 2010.

(51) Int. Cl.
*G06Q 40/00* (2012.01)
(52) U.S. Cl.
USPC ............................................. 705/37; 705/39
(58) Field of Classification Search
USPC ............................................. 705/35–45, 14.7
See application file for complete search history.

(56) References Cited

U.S. PATENT DOCUMENTS

| | | | |
|---|---|---|---|
| 5,758,328 A | 5/1998 | Giovannoli | |
| 6,564,192 B1 | 5/2003 | Kinney, Jr. et al. | |
| 7,124,089 B2 | 10/2006 | Cornwell | |
| 7,330,826 B1 * | 2/2008 | Porat et al. | 705/26.3 |
| 7,343,360 B1 * | 3/2008 | Ristanovic et al. | 705/412 |
| 7,571,131 B1 | 8/2009 | Lewis et al. | |
| 2002/0133456 A1 * | 9/2002 | Lancaster et al. | 705/37 |

OTHER PUBLICATIONS www.fltplan.com.*

* cited by examiner

*Primary Examiner* — Richard C Weisberger
(74) *Attorney, Agent, or Firm* — Thomas C. Saitta

(57) ABSTRACT

A computer-based network auction system and method where geographically dispersed aircraft operators solicit competitive quotes for fuel and services from geographically dispersed FBOs, and FBOs submit quotes and communicate and market directly to aircraft operators planning trips to the FBOs airport or nearby airports.

6 Claims, 4 Drawing Sheets

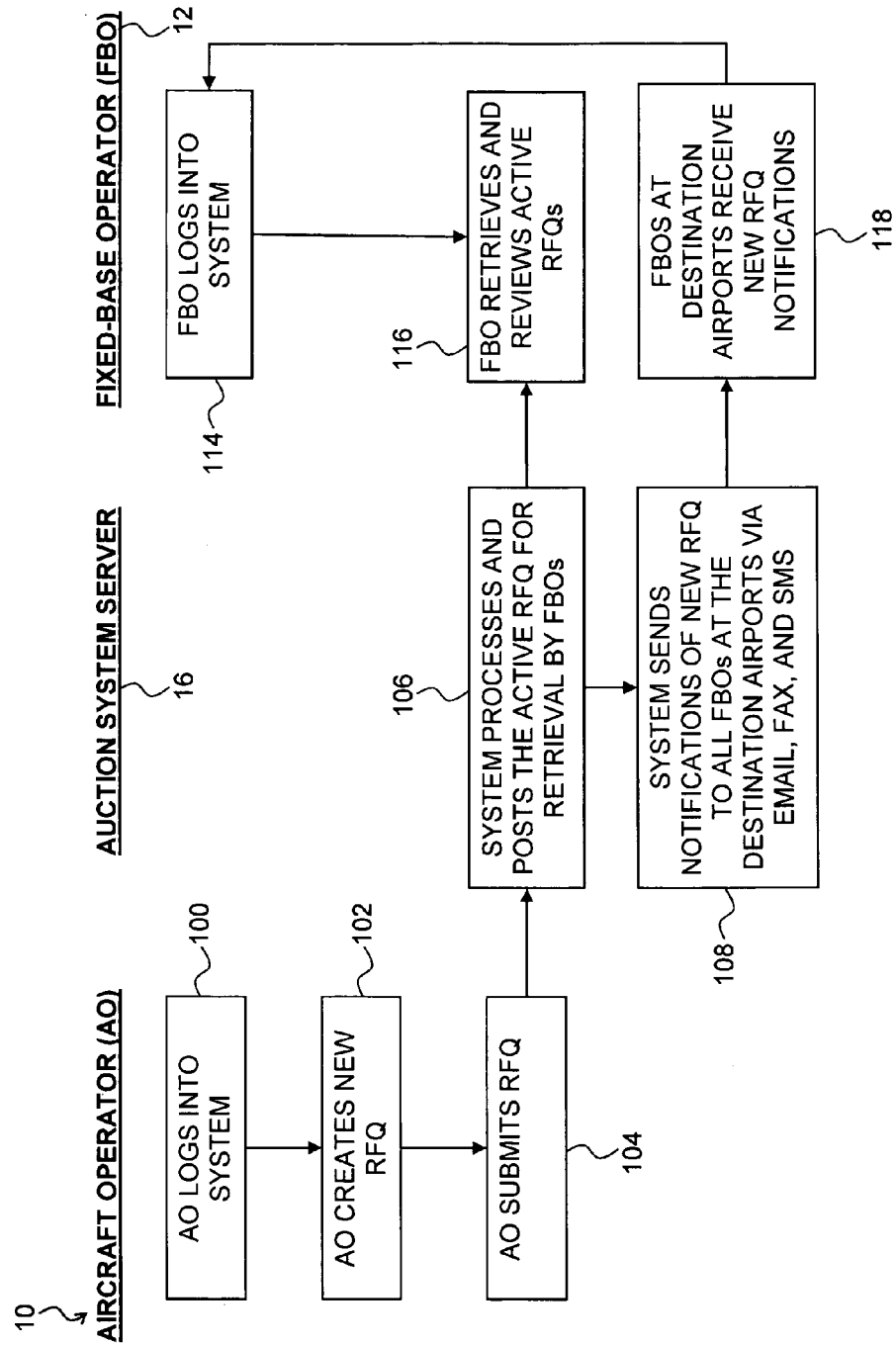

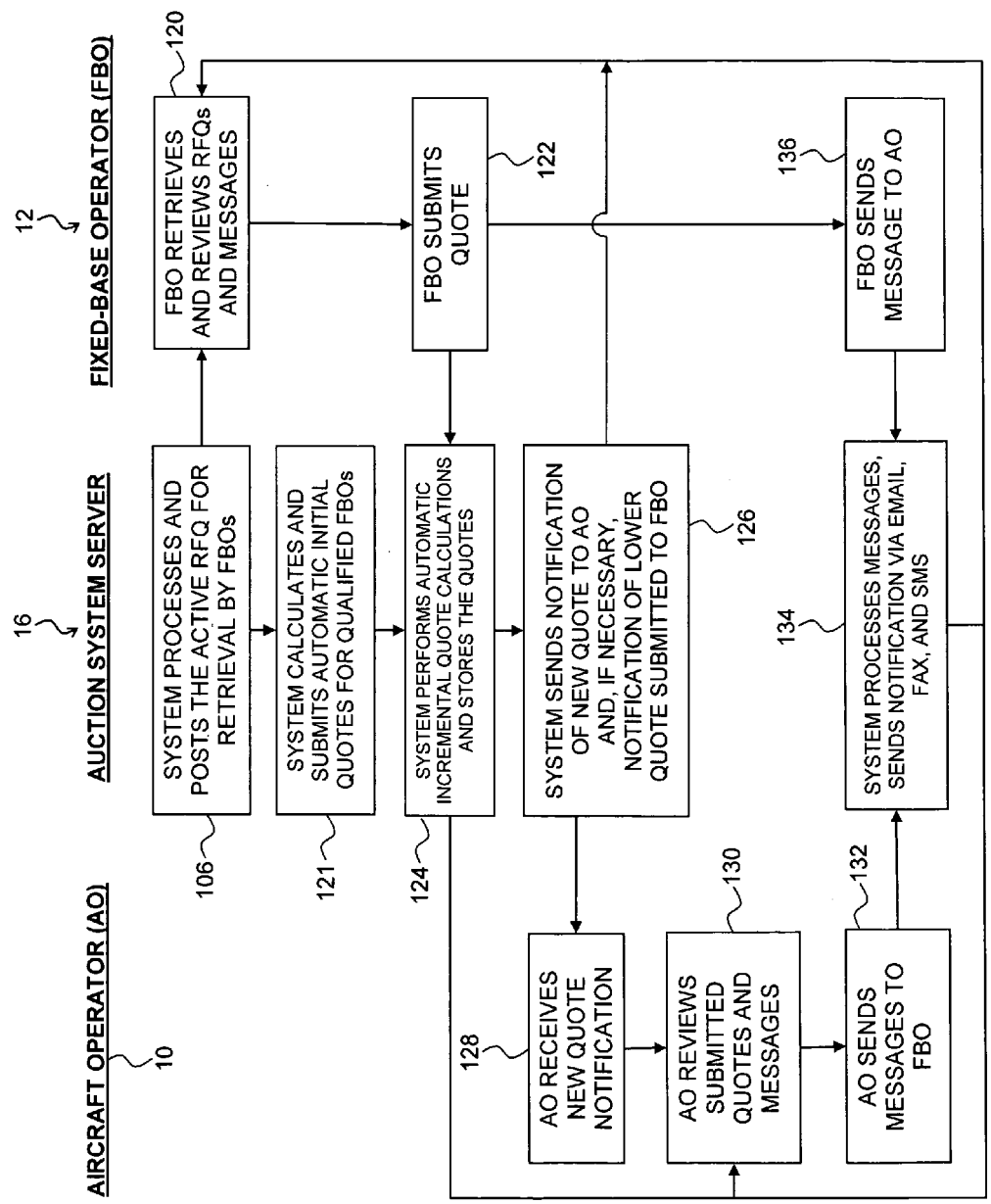

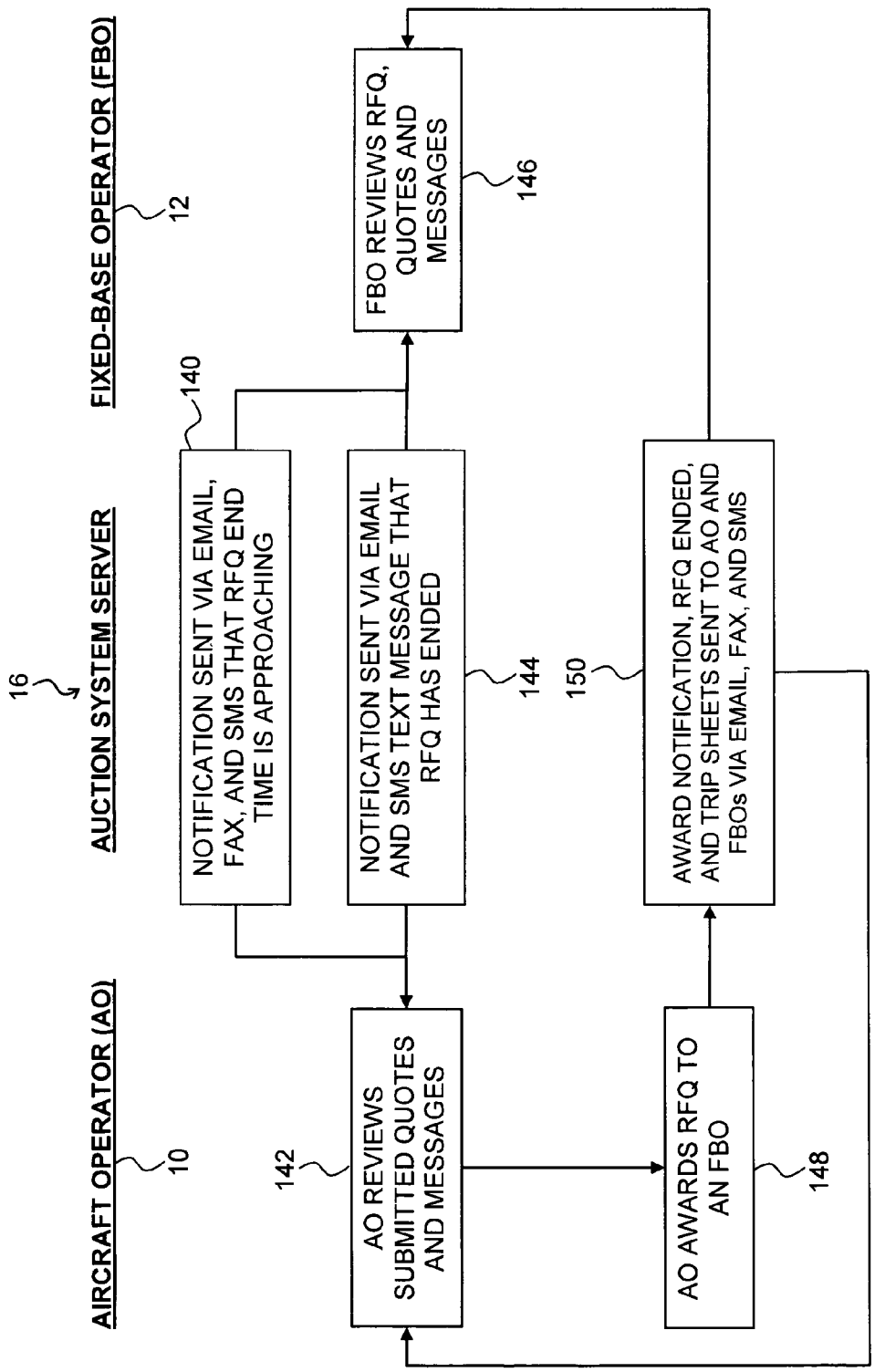

SYSTEM AND METHOD FOR AUCTION BASED SALES AND PROCUREMENT OF GEOGRAPHICALLY DISPERSED AVIATION FUEL AND SERVICES

This application claims the benefit of U.S. Provisional Patent Application Ser. No. 61/402,894, filed Sep. 7, 2010.

BACKGROUND OF THE INVENTION

The present invention relates in general to auction based sales and procurement systems and methods, and more particularly to reverse auctions, wherein the auction is performed over a global computer network, and more particularly relates to the technical field involving the sale and procurement of aviation fuel and services to geographically dispersed aircraft operators by geographically dispersed providers.

General aviation (GA) is a category of civil aviation, both commercial and non-commercial, that refers to all flights other than military and scheduled airline flights. GA covers a wide range of activities including private flying, flight training, air ambulance, law enforcement, firefighting, air charter, bush flying, gliding, and many others. GA includes all type of aircraft, from powered parachutes to helicopters and large jet aircraft. GA aircraft operators purchase fuel and ground support services from airport-based businesses called fixed-base operators (FBOs). Aviation fuel is typically an aircraft operator's single largest direct operating cost. In addition to selling fuel, FBOs provide a variety of services to aircraft such as maintenance, towing, hangaring, ground power, catering, cleaning, etc. FBOs also provide services and amenities to passengers and crew members such as waiting lounges, flight planning rooms, weather terminals, crew rest quarters, showers, automobile rentals, hotel reservations, etc.

Aircraft operators shop for fuel and services from FBOs through a time-consuming, inefficient, and uneconomical process. When planning flights, aircraft operators consult directories that list the FBOs located at their destination airports. The aircraft operator researches the ability of the available FBOs to provide the required fuel and services and their costs. This time-consuming process requires multiple telephone calls to the FBOs, manually compiling the information, then selecting an FBO based upon its capabilities and published retail prices. By simply comparing published retail prices, the aircraft operator is denied potential cost-savings that could be achieved through a more competitive solicitation and negotiation process. The existing method for procuring fuel and services from FBOs is cumbersome, inefficient, and costly in terms of both time and money. Aircraft operators could save considerable time and money if there was a single marketplace where they could easily solicit competitive quotes from multiple FBOs across a wide geographic range in a single-step process.

FBOs compete against each other for the business of aircraft operators. Depending upon individual market conditions, there can be as few as one or as many as several FBOs located at an airport. There are approximately 5200 public-use airports in the United States serviced by approximately 3100 FBOs, with over 225,000 GA aircraft currently registered in the U.S. FBOs compete with FBOs located at their particular airport and at other airports where aircraft operators could alternatively choose to buy fuel and services. FBOs promote their businesses through advertising, trade shows, and industry events and they aggressively seek the business of any aircraft that might visit their airport. Because of the transient nature of their customers, FBOs must direct their sales and marketing efforts to the entire fleet of GA aircraft. Targeting such a broad base of potential customers requires a shotgun approach to marketing that is expensive, inefficient, and results in poor advertising returns because FBOs can expect to capture only a very small percentage of the market. Also, many FBOs are small businesses and cannot afford such expensive marketing campaigns. FBOs could benefit in terms of advertising cost savings and increased revenue if they could narrow their sales efforts to aircraft operators that are pre-qualified and self-identified as potential customers planning visits to the FBO's airport or nearby airports.

The present method for the sale and procurement of aviation fuel and services is hampered by numerous wasteful inefficiencies. Both aircraft operators and FBOs can benefit greatly from a more efficient marketplace and system where the parties could streamline their sales and procurement efforts. Aircraft operators could enjoy the benefits of one-stop shopping with confidence they are obtaining the most competitive prices via the most efficient acquisition method. FBOs could enjoy the benefit of the efficient marketplace as an effective sales tool to precisely target prospective, pre-qualified customers.

It is an object of this invention to provide an auction based sales and procurement system for aviation fuel and services offered by geographically dispersed FBOs and sought by geographically dispersed aircraft operators, the system functioning over a global computer system.

SUMMARY OF THE INVENTION

One embodiment of the present system and method includes a reverse auction based sales and procurement system for aviation fuel and services offered by geographically dispersed FBOs to geographically dispersed aircraft operators. The system and methodology uses network communications via a global computer network and is implemented by software. The network based auction system and method includes three stages.

The first stage includes a Request For Quote (RFQ) that the aircraft operator initiates as the buyer of aviation fuel and services. The aircraft operator specifies the critical details of the procurement and submits the RFQ. The system processes the information and notifies the qualified Fixed-Base Operators (FBOs) at the appropriate airports and invites them to submit competitive quotes within the scope of the RFQ.

The second stage includes the submission of quotes by the FBOs as the sellers of aviation fuel and services. FBOs prepare and submit detailed quotes to the system which processes the quotes for retrieval by the aircraft operator. The system employs automatic initial quoting that allows an FBO to automatically post an initial quote immediately upon receipt of an RFQ without undertaking an affirmative response step. The system also employs incremental quoting that automatically posts quotes on behalf of an FBO down to a stated minimum price so that manual entry of a new quote is not required every time a competing FBO places a lower quote. In addition, FBOs can manually update their quotes any time before the RFQ period ends. During this stage, the system enables the FBOs and the aircraft operator to communicate directly with each other via the system's private messaging service. The system notifies each party every time a new quote or message is submitted.

The third stage includes the awarding of an RFQ by the aircraft operator. After reviewing the quotes, the aircraft operator selects a winning quote and awards the RFQ to one FBO. The system then notifies the winning and losing FBOs and sends trip sheet confirmation to the aircraft operator and to the winning FBO specifying the aircraft's flight information and terms of the awarded RFQ.

In alternative format, the invention comprises a computer-based reverse auction method for the sale and procurement of aviation fuel and services from geographically dispersed fixed base operators (FBOs) to geographically dispersed aircraft operators comprising the steps of utilizing an array of multiple computers in communication over a global computer network, said computers comprising geographically dispersed aircraft operator computers operated by distinct aircraft operators, geographically dispersed FBO computers operated by distinct FBOs, and an auction system server, said auction system server having operational software for implementation of the method; receiving on said auction system server a Request For Quote (RFQ) from one of said aircraft operators, said one of said aircraft owners being a requesting aircraft operator, said RFQ providing information as to possible destination airports, fuel requirements and any other desired services; distributing said RFQ by said auction system server to suitable FBOs as determined by the RFQ information; receiving submitted price quotes from said suitable FBOs on said auction system server; delivering from said auction system server said price quote submissions from said suitable FBOs to said requesting aircraft operator; receiving on said auction system server a selection by said requesting aircraft operator of one of said suitable FBOs; and communicating from said auction system server to said selected FBO notification of the award of said RFQ to said selected FBO.

In another alternative format, the invention comprises a reverse auction based method for the sale and procurement of aviation fuel and services from geographically dispersed fixed base operators (FBOs) to geographically dispersed aircraft operators, said method utilizing a network of computers in communication via a global computer network, said method comprising the steps of maintaining an auction system server and providing software implementing said method on said auction system server, said auction system server in communication via a global computer network with geographically dispersed aircraft operator computers operated by distinct aircraft operators and geographically dispersed FBO computers operated by distinct FBOs, and an auction system server; receiving through said auction system server a Request For Quote (RFQ) from one of said aircraft operators, said one of said aircraft owners being a requesting aircraft operator, said RFQ providing information as to possible destination airports, fuel requirements and any other desired services; distributing said RFQ from said auction system server to suitable FBOs as determined by the RFQ information and said software; receiving through said auction system server price quotes from said suitable FBOs; delivering through said auction system server said price quotes from said suitable FBOs to said requesting aircraft operator; receiving through said auction system server a selection of one of said suitable FBOs by said requesting aircraft operator, said one of said suitable FBOs being a selected FBO; and notifying through said auction system server the award of said RFQ to said selected FBO.

BRIEF DESCRIPTION OF THE DRAWINGS

FIG. 2 depicts a flow chart of the first stage of the system and method.

FIG. 3 depicts a flow chart of the second stage of the system and method.

FIG. 4 is a flow chart of the third stage of the system and method.

DETAILED DESCRIPTION OF THE INVENTION

Figure 1:
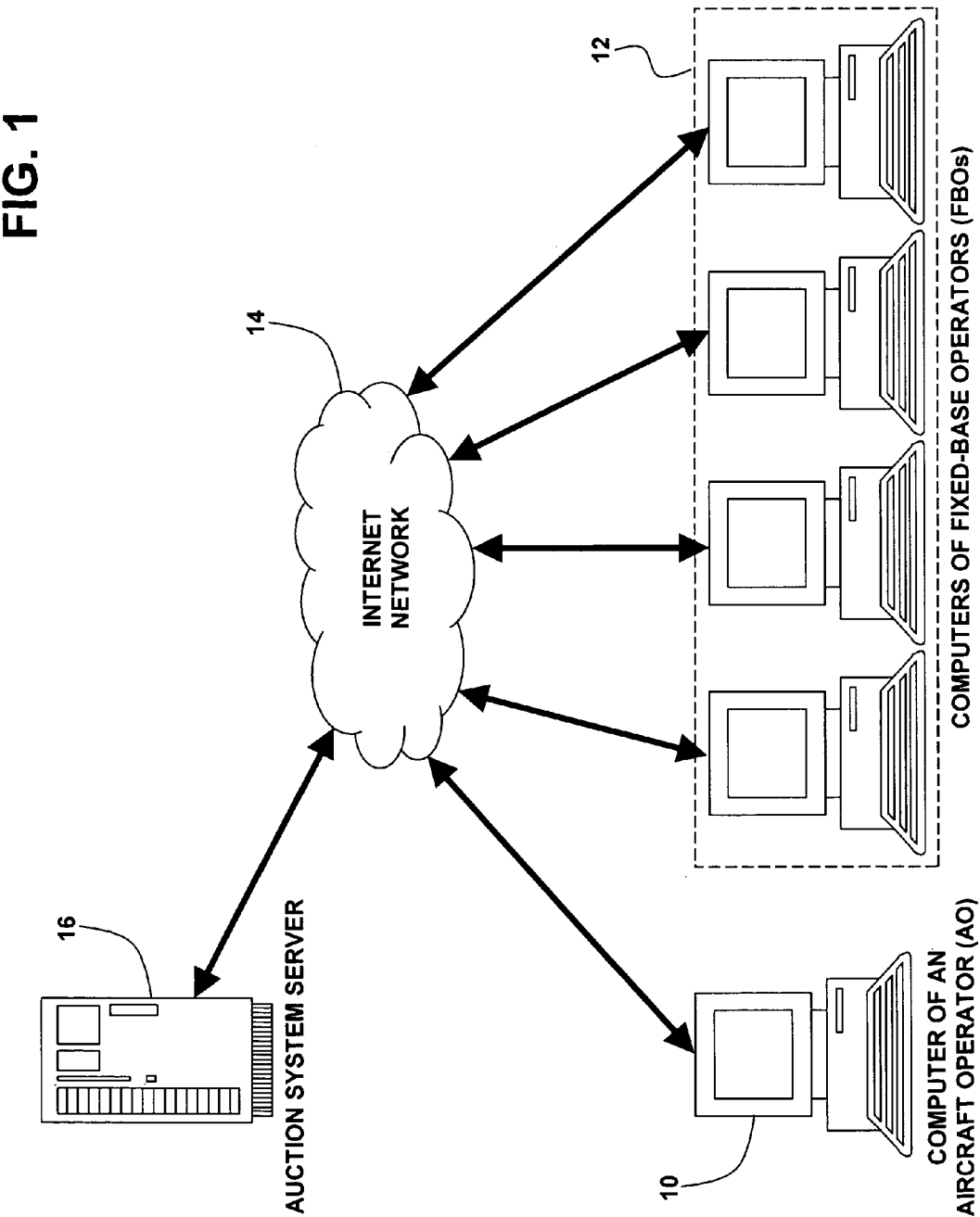
FIG. 1 depicts a simplified diagram of network communications utilized in the system and method.

With reference to the drawings, the various embodiments of the invention will now be described in detail with regard for the best mode and the preferred embodiment. In a most general sense, the invention is a reverse auction based sales and procurement system and method for aviation fuel and services offered by geographically dispersed FBOs sought by geographically dispersed aircraft operators, the system functioning over a global computer system.

One embodiment of the present system and method includes a reverse auction based sales and procurement system for aviation fuel and services. The system uses dedicated software and network communications via a global network of interconnected computer networks that allows aircraft operators, the system operators and the FBOs to communicate together, typically referred to as the Internet or the World Wide Web, in the normal format of the interactive and stored pages consisting of text, graphics, and other multimedia components. The network based auction system includes three stages.

The first stage includes a Request For Quote (RFQ) that the aircraft operator initiates as the buyer of aviation fuel and services. The aircraft operator specifies the critical details of the procurement including the preferred or possible destination airports, arrival and departure dates and times, estimated fuel quantities to purchase, requested aircraft and ground services, and the RFQ ending date and time. If an aircraft operator has previously obtained a contracted fuel price with a third-party fuel broker, the aircraft operator can enter that price on the RFQ and that price will serve as the starting quote that the FBOs will be invited to beat. When the aircraft operator submits the RFQ, the system processes the information and notifies the qualified FBOs at the appropriate airports and invites them to submit competitive quotes for fuel and services within the scope of the RFQ.

The second stage includes the submission of quotes by the FBOs as the sellers of aviation fuel and services. The system automatically notifies FBOs of new RFQs and the FBOs prepare and submit detailed quotes for the requested products and services. To help FBOs prepare intelligent competitive quotes, the system publishes the current lowest fuel price quote submitted by competing FBOs or the aircraft operator's third-party fuel broker's price, whichever is lowest. The system reveals the identity of the quoting FBOs only to the aircraft operator. FBOs do not know the identity of the other quoting FBOs.

As a convenience for FBOs, the system employs automatic initial quoting that allows an FBO to automatically post an initial fuel quote immediately upon receipt of an RFQ, even if the network computer is not being monitored. The system calculates the automatic initial quote based upon the FBO's current retail fuel price minus the FBO's volume discount for the quantity of fuel specified in the RFQ. The system determines the FBO's current retail price and volume discount tiers from data provided and maintained on the system by the FBO, or from third-party data providers.

For example, an FBO's current published retail price for fuel is $6.00 per gallon. The FBO's volume discount is $0.50 per gallon for quantities above 1000 gallons. An aircraft operator submits an RFQ requesting 1200 gallons. The system would automatically submit an initial quote on behalf of the FBO for $5.50 per gallon ($6.00 retail price−$0.50 volume discount=$5.50).

As a further convenience, the system employs automatic incremental quoting that automatically posts fuel quotes on behalf of an FBO down to a stated minimum price so they don't have to manually re-quote every time another FBO places a lower quote. FBOs submit their fuel quotes as the minimum price they are willing to charge per gallon. The system then determines the RFQ's current lowest quote and automatically submits incrementally lower quotes on behalf of the FBO just low enough to make their quote the lowest, stopping when their minimum price has been reached. The system performs this calculation repeatedly against all minimum prices submitted by all FBOs until it determines the RFQ's current lowest quote submitted. The system then notifies the FBOs whose minimum prices have been beaten that their quotes are no longer the lowest so they can quote again if they want to.

For example, the current lowest quote for an RFQ is $6.00 per gallon, which is below FBO #1's last quote. FBO #1 has previously submitted a minimum price of $5.90. FBO #1's quote is automatically incremented down to $5.99 and now becomes the RFQ's current lowest quote. FBO #2 has previously submitted a minimum price of $5.80. FBO #1's quote cannot be automatically incremented below its minimum price of $5.90, so FBO #2's quote is automatically incremented down to $5.89 and now becomes the RFQ's current lowest quote.

FBOs can update their quotes to remain competitive any time before the RFQ ends. During this stage, the system enables the FBOs and the aircraft operator to communicate directly with each other via the system's private messaging service. The messaging service allows the parties to seek clarification, promote themselves, offer and solicit special incentives, and generally negotiate the terms of the transaction. The system notifies each party every time a new quote or message is submitted.

The third stage includes the awarding of an RFQ by the aircraft operator. After reviewing the competitive quotes and messages submitted by the FBOs, the aircraft operator selects a winning quote and awards the RFQ to one FBO. The system then notifies the FBOs that the RFQ has ended and been awarded. The system then sends trip sheet confirmations to the aircraft operator and to the winning FBO specifying the aircraft's flight information and the terms of the awarded RFQ. Alternatively, the aircraft operator may choose not to award the RFQ or may cancel the RFQ altogether.

Referring now to the invention in more detail, FIG. 1 shows a simplified diagram of computer network communications. Computer 10 operated by an aircraft operator, computers 12 operated by different FBOs, and Auction System Server 16 are coupled to the global computer network (i.e., the Internet) 14. Server 16 performs the programmed calculations and logical functions of the system and serves as a repository of FBO data, aircraft operator data, RFQs, quotes, and messages. A web browser which runs on each of computers 10 and 12 retrieves web pages from server 16 via the Internet 14. An aircraft operator 10 submits a Request for Quote (RFQ) to Server 16. Server 16 processes the RFQ and sends notification messages to the appropriate FBOs 12. FBOs 12 respond by retrieving the RFQ and submitting quotes to Server 16. Server 16 processes the quotes and sends notification messages to aircraft operator 10. Aircraft operator 10 retrieves and reviews the quotes from server 16. When the RFQ ends, aircraft operator 10 selects a winning quote and awards the RFQ to an FBO 12. Server 16 processes the awarded RFQ and sends the appropriate notification messages to the FBOs 12.

FIG. 2 illustrates one implementation embodiment of the first stage of the invention—the creation and submission of an RFQ. After registering with the auction system server 16 and providing personal account information, an aircraft operator 10 logs into the system 100 using a discrete ID and password. Once logged in, aircraft operator 10 can create new RFQs 102, submit RFQs 104, review active and closed RFQs, edit RFQs, cancel RFQs, award RFQs, and send and receive messages to and from FBOs 12.

In advance of a planned flight, an aircraft operator 10 initiates an auction by creating a new RFQ 102. During this step, the aircraft operator 10 provides the system 16 with the flight information necessary for FBOs 12 to provide competitive quotes. This information includes the destination airport (s), arrival and departure dates and times, the type of aircraft and registration number, the type and estimated quantity of fuel to be purchased, any necessary fuel additives, a prearranged contracted fuel price from a third-party broker (if known), the aircraft services required, the ground services required, and any special requests aircraft operator 10 would like the competing FBOs 12 to fulfill.

Aircraft operators 10 often have the option of choosing a destination from several different airports in a geographical area. For each RFQ, the system server 16 allows aircraft operator 10 to choose multiple airports from which to simultaneously solicit quotes from FBOs 12. For example, an aircraft traveling to the Washington, D.C. area could solicit quotes from FBOs located at Dulles Airport, Reagan National Airport, Baltimore-Washington Airport and any other smaller airport facility or reliever airport. Broadening the field of solicited FBOs 12 benefits the aircraft operator by bringing more competition into the market for the transaction. FBOs 12 benefit from this expanded marketplace by having the opportunity to capture a sale that might otherwise go to a competing FBO 12 at another airport.

After creating a new RFQ 102, the aircraft operator 10 submits the RFQ 104 to the system server 16, which immediately processes and posts the RFQ for retrieval by FBOs 106. The system server 16 sends instant notifications of the new RFQ to all FBOs 12 at the destination airports via email, fax and SMS text messages 108. Upon receipt of the new RFQ notifications 118, FBOs 12 log into the system 114 and retrieve the active RFQs 116.

As an alternative to immediately submitting an RFQ 104 to the system server 16, aircraft operator 10 has the option to save the RFQ as a draft in the system for later retrieval and submission by the aircraft operator 10.

Even FBOs not registered with the system may be sent notifications of new RFQs submitted by aircraft operators 10. At such time, the non-registered FBOs 12 can register with the system, provide current fuel pricing and volume discounts, elect to have automatic initial quotes submitted on their behalf, etc.

FIG. 3 illustrates one implementation embodiment of the second stage of the invention—the quote submission process. When aircraft operator 10 submits an RFQ to the system for processing and retrieval by FBOs 106, the system determines if invited FBOs have elected to automatically submit initial fuel quotes and calculates and submits those quotes 121. FBOs 12 retrieve and review RFQs 120 stored on the system server 106. FBOs 12 respond to the RFQ by submitting competitive quotes 122 that state the minimum prices and terms FBO 12 is willing to grant aircraft operator 10 according to the RFQ specifications. The system 16 performs the automatic incremental quote calculations from all submitting FBOs to determine the lowest quote from each FBO then stores the quotes 124 for aircraft operator 10 to retrieve and review 130. The system 16 sends a notification 126 to the aircraft operator 10 that a new quote has been received 128 and, if necessary the system 16 sends notifications 126 to FBOs 12 whose minimum prices have been beaten that their quotes are no longer the lowest so they can quote again if they want to. When processing and storing quotes 124, the system publishes the current lowest quote for fuel submitted by an FBO 12 or the aircraft operator's prearranged third-party fuel broker price, whichever is lower. This allows FBOs 12 to see the current lowest quote they are competing against and to submit a competitive quote accordingly. When submitting a quote, the system 16 allows FBOs 12 to send messages 136 directly to aircraft operator 10 through server 16's private messaging system 134. FBOs 12 can use this feature to reach out to aircraft operator 12 with elaboration of its quote and to further promote its business and offer enticements, or to respond to a previous message from the aircraft operator 10. The system 16 also allows aircraft operator 12 to send messages 132 to quoting FBOs 12 through server 16's private messaging system 134. Aircraft operators 10 can use this feature to seek clarification of a quote or seek special terms and enhancements to the proposed transaction. System 134 sends email and SMS notifications to recipients advising that a new message has been received.

FIG. 4 illustrates one implementation embodiment of the third stage of the invention—the quote award process. As the RFQ approaches its designated end time, auction system server 16 automatically sends reminder notifications 140 via email and SMS text message to aircraft operator 10 and FBOs 12. These notices remind FBOs 12 to retrieve and review the RFQ and messages 146 and check the current status of their quote compared to the current lowest quote, to reply to messages from aircraft operator 10, and to update their quote to remain competitive. The notices remind aircraft operator 10 to review the submitted quotes and messages 142 and to send or reply to messages from FBOs 12. When the RFQ reaches its designated end time, system server 16 closes the RFQ and prohibits FBOs 12 from submitting any further quotes. Notifications that the RFQ has ended 144 are sent to aircraft operator 10 and all participating FBOs 12. Aircraft operator 10 reviews the submitted quotes and awards the RFQ 148. Notifications of the awarded RFQ 150 are sent via email and SMS text messaging to all FBOs 12. The system 150 sends trip sheet confirmations to the aircraft operator 10 and to the winning FBO 12 specifying the aircraft's flight information and the terms of the awarded RFQ.

Alternatively, aircraft operator 10 can choose to award an RFQ 148 to an FBO 12 and end the RFQ prior to its designated end time. This option gives the aircraft operator 10 the flexibility to accept a quote it finds favorable early in the RFQ process. This option also provides incentives to FBOs 12 to quote competitively and early in the RFQ process in hopes of closing the deal early.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention, as set forth in the following claims.

I claim:

1. A computer-based reverse auction method for the sale and procurement of aviation fuel and services from geographically dispersed fixed base operators (FBOs) to geographically dispersed aircraft operators comprising the steps of:
   utilizing an array of multiple computers in communication over a global computer network, said computers comprising geographically dispersed aircraft operator computers operated by distinct aircraft operators, geographically dispersed FBO computers operated by distinct FBOs, and an auction system server, said auction system server having operational software for implementation of the method;
   receiving on said auction system server a Request For Quote (RFQ) from one of said aircraft operators, said one of said aircraft owners being a requesting aircraft operator, said RFQ providing information as to possible destination airports, fuel requirements and any other desired services;
   distributing said RFQ by said auction system server to suitable FBOs as determined by the RFQ information;
   receiving submitted price quotes from said suitable FBOs on said auction system server;
   delivering from said auction system server said price quote submissions from said suitable FBOs to said requesting aircraft operator;
   receiving on said auction system server a selection by said requesting aircraft operator of one of said suitable FBOs; and
   communicating from said auction system server to said selected FBO notification of the award of said RFQ to said selected FBO.

2. The method of claim 1, wherein said step of receiving submitted price quotes from said suitable FBOs to said auction system server comprises the step of automatically acknowledging a previous submission of an initial price quote to said auction system server by said FBOs.

3. The method of claim 2, wherein said step of receiving submitted price quotes from said suitable FBOs to said auction system server comprises the step of automatically acknowledging a minimum price quote previously submitted to said auction system server by said FBOs; and
   wherein said method further comprises the step of automatic incremental quoting by said auction system server, whereby said price quotes are automatically reduced until the lowest minimum price quote is reached.

4. The method of claim 2, wherein said step of automatically acknowledging a previous submission of an initial price quote to said auction system server by said FBOs further comprises calculating fuel volume discounts previously submitted to said auction system server by said FBOs.

5. The method of claim 2, wherein said step of receiving submitted price quotes from said suitable FBOs to said auction system server comprises the step of automatically acknowledging a minimum price quote previously submitted to said auction system server by said FBOs; and
   wherein said method further comprises the step of automatic incremental quoting by said auction system server, whereby said price quotes are automatically reduced until the lowest minimum price quote is reached.

6. The method of claim 1, further comprising the step of sending and receiving through said auction system server private messages between said requesting aircraft operator and said FBOs.

\* \* \* \* \*